United States Patent
Gay et al.

(10) Patent No.: US 9,286,574 B2
(45) Date of Patent: Mar. 15, 2016

(54) SYSTEMS AND METHODS FOR LAYERED TRAINING IN MACHINE-LEARNING ARCHITECTURES

(71) Applicant: Google Inc., Mountain View, CA (US)

(72) Inventors: David Roger Gay, Kitchener (CA); Paul Church, Cambridge (CA); Russell O'Connor, Kitchener (CA); Vinay Chaudhary, Pittsburgh, PA (US); Yaroslav Litus, Kitchener (CA)

(73) Assignee: Google Inc., Mountain View, CA (US)

( * ) Notice: Subject to any disclaimer, the term of this patent is extended or adjusted under 35 U.S.C. 154(b) by 207 days.

(21) Appl. No.: 14/071,375

(22) Filed: Nov. 4, 2013

(65) Prior Publication Data

US 2015/0127590 A1      May 7, 2015

(51) Int. Cl.
*G06N 5/02*    (2006.01)
*G06N 99/00*    (2010.01)

(52) U.S. Cl.
CPC ............... *G06N 99/005* (2013.01); *G06N 5/02* (2013.01)

(58) Field of Classification Search
None
See application file for complete search history.

(56) References Cited

U.S. PATENT DOCUMENTS

| | | | | |
|---|---|---|---|---|
| 6,879,971 | B1 * | 4/2005 | Keeler et al. | 706/21 |
| 7,203,635 | B2 * | 4/2007 | Oliver et al. | 703/22 |
| 8,407,226 | B1 * | 3/2013 | Das et al. | 707/739 |
| 8,464,184 | B1 * | 6/2013 | Cook et al. | 715/863 |
| 8,478,699 | B1 * | 7/2013 | Alfonseca et al. | 706/12 |
| 2003/0130899 | A1 * | 7/2003 | Ferguson et al. | 705/26 |
| 2007/0271184 | A1 * | 11/2007 | Niebert et al. | 705/51 |
| 2009/0011743 | A1 * | 1/2009 | Johanson et al. | 455/414.1 |
| 2009/0125412 | A1 * | 5/2009 | Watson et al. | 705/26 |
| 2011/0125867 | A1 * | 5/2011 | Denk, Jr. | 709/217 |
| 2011/0163944 | A1 * | 7/2011 | Bilbrey et al. | 345/156 |
| 2012/0278727 | A1 * | 11/2012 | Ananthakrishnan et al. | 715/748 |
| 2013/0083005 | A1 * | 4/2013 | Arrasvuori | 345/419 |
| 2013/0138506 | A1 * | 5/2013 | Zhu et al. | 705/14.53 |
| 2014/0100944 | A1 * | 4/2014 | Zhu et al. | 705/14.41 |
| 2014/0160941 | A1 * | 6/2014 | Hui et al. | 370/241 |

FOREIGN PATENT DOCUMENTS

EP      2 461 273      6/2012

OTHER PUBLICATIONS

International Search Report and Written Opinion on PCT/US2014/063159 dated Jan. 29, 2015.

* cited by examiner

*Primary Examiner* — Kakali Chaki
*Assistant Examiner* — Viker Lamardo
(74) *Attorney, Agent, or Firm* — Foley & Lardner LLP; John D. Lanza; James De Vellis

(57) ABSTRACT

A computer-implemented method for layered training of machine-learning architectures includes receiving a plurality of data elements wherein each data element is associated with a timestamp, determining a training window for each model layer of a layered stack of model layers, determining a plurality of training data elements for each training window by identifying the data elements with timestamps corresponding to each of the training windows, identifying a previous checkpoint for each model layer wherein the previous checkpoint for each model layer is generated by a parent model layer, training each model layer with the determined training data elements for each model layer and the identified previous checkpoint for each model layer, generating a plurality of current checkpoints wherein each current checkpoint of the plurality of current checkpoints is associated with a model layer, and storing the plurality of current checkpoints at the memory.

17 Claims, 7 Drawing Sheets

SYSTEMS AND METHODS FOR LAYERED TRAINING IN MACHINE-LEARNING ARCHITECTURES

BACKGROUND

This description relates to machine-learning, and more particularly, to methods and systems for using layered training in machine-learning architectures.

Known methods of online machine-learning receive streamed data to train models to conform to the streamed data. Additionally, other known methods of machine-learning receive batches of data to train models to conform to the received batches of data. At least some known systems distinguish streamed data based upon a time with which it is associated. Accordingly, when streamed data arrives late, a model may have been trained in the absence of the data. Therefore, in at least some known systems, latency in the arrival of streamed data requires refactoring, recalibration, or relearning for models. Such latency may further cause instability because late arriving data may cause significant adjustments in the model. In at least some known systems, it may be inefficient or impractical for the system to wait for all late-arriving data before training.

BRIEF DESCRIPTION OF THE DISCLOSURE

In one aspect, a computer-implemented method for layered training of machine-learning architectures is provided. The method is implemented by a training computing device coupled to a memory. The method includes receiving a plurality of data elements wherein each data element is associated with a timestamp, determining a training window for each model layer of a layered stack of model layers, determining a plurality of training data elements for each training window by identifying the data elements with timestamps corresponding to each of the training windows, identifying a previous checkpoint for each model layer if the previous checkpoint for each model layer exists wherein the previous checkpoint for each model layer is generated by a parent model layer, training each model layer with the determined training data elements for each model layer and the identified previous checkpoint, if any, for each model layer, generating a plurality of current checkpoints wherein each current checkpoint of the plurality of current checkpoints is associated with a model layer, and storing the plurality of current checkpoints at the memory.

In another aspect, a training computing device for layered training of machine-learning architectures is provided. The training computing device includes a memory for storing data and a processor in communication with the memory. The processor is configured to receive a plurality of data elements wherein each data element is associated with a timestamp, determine a training window for each model layer of a layered stack of model layers, determine a plurality of training data elements for each training window by identifying the data elements with timestamps corresponding to each of the training windows, identify a previous checkpoint for each model layer if the previous checkpoint for each model layer exists wherein the previous checkpoint for each model layer is generated by a parent model layer, train each model layer with the determined training data elements for each model layer and the identified previous checkpoint, if any, for each model layer, generate a plurality of current checkpoints, wherein each current checkpoint of the plurality of current checkpoints is associated with a model layer, and store the plurality of current checkpoints at the memory.

In another aspect, a computer-readable storage device having processor-executable instructions embodied thereon, for layered training of machine-learning architectures is provided. When executed by a computing device, the processor-executable instructions cause the computing device to receive a plurality of data elements wherein each data element is associated with a timestamp, determine a training window for each model layer of a layered stack of model layers, determine a plurality of training data elements for each training window by identifying the data elements with timestamps corresponding to each of the training windows, identify a previous checkpoint for each model layer if the previous checkpoint for each model layer exists, wherein the previous checkpoint for each model layer is generated by a parent model layer, train each model layer with the determined training data elements for each model layer and the identified previous checkpoint, if any, for each model layer, generate a plurality of current checkpoints, wherein each current checkpoint of the plurality of current checkpoints is associated with a model layer, and store the plurality of current checkpoints at the memory.

In another aspect, a system for layered training of machine-learning architectures is provided. The system includes means for receiving a plurality of data elements wherein each data element is associated with a timestamp, means for determining a training window for each model layer of a layered stack of model layers, means for determining a plurality of training data elements for each training window by identifying the data elements with timestamps corresponding to each of the training windows, means for identifying a previous checkpoint for each model layer if the previous checkpoint for each model layer exists wherein the previous checkpoint for each model layer is generated by a parent model layer, means for training each model layer with the determined training data elements for each model layer and the identified previous checkpoint, if any, for each model layer, means for generating a plurality of current checkpoints wherein each current checkpoint of the plurality of current checkpoints is associated with a model layer, and means for storing the plurality of current checkpoints at the memory.

In another aspect, the system described above is provided, wherein the system further includes means for adapting each model layer to the determined training data elements for each model layer by applying at least one machine-learning algorithm.

In another aspect, the system described above is provided, wherein the system further includes means for determining a layer depth of each model layer, means for retrieving a training model configuration wherein the training model configuration designates a training delay record associated with each layer depth, means for identifying a training delay associated with the layer depth of each model layer based upon the training model configuration, and means for calculating a training window based upon the training delay for each model layer.

In another aspect, the system described above is provided, wherein the system further includes means for synchronizing an external server with at least one current checkpoint associated with at least one model layer, wherein the external server serves based at least partially on the synchronized current checkpoint.

In another aspect, the system described above is provided, wherein the system further includes means for determining a layer depth for each model layer, means for retrieving a training model configuration wherein the training model configuration designates a training duration associated with each layer depth, means for identifying a training duration associated with the layer depth of each model layer based upon the training model configuration, means for training the model layer for the identified training duration, and means for processing each model layer into the current checkpoint.

In another aspect, the system described above is provided, wherein the system further includes means for purging the previous checkpoint for each model layer, and means for retraining each model layer.

In another aspect, the system described above is provided, wherein the system further includes means for validating each checkpoint of the plurality of current checkpoints against the plurality of data elements, and means for storing validated checkpoints of the plurality of current checkpoints at the memory.

In another aspect, the system described above is provided, wherein the system further includes means for receiving a plurality of conversion data, wherein the conversion data represents conversion activity associated with serving online advertisements.

The features, functions, and advantages described herein may be achieved independently in various embodiments of the present disclosure or may be combined in yet other embodiments, further details of which may be seen with reference to the following description and drawings.

Figure 1:
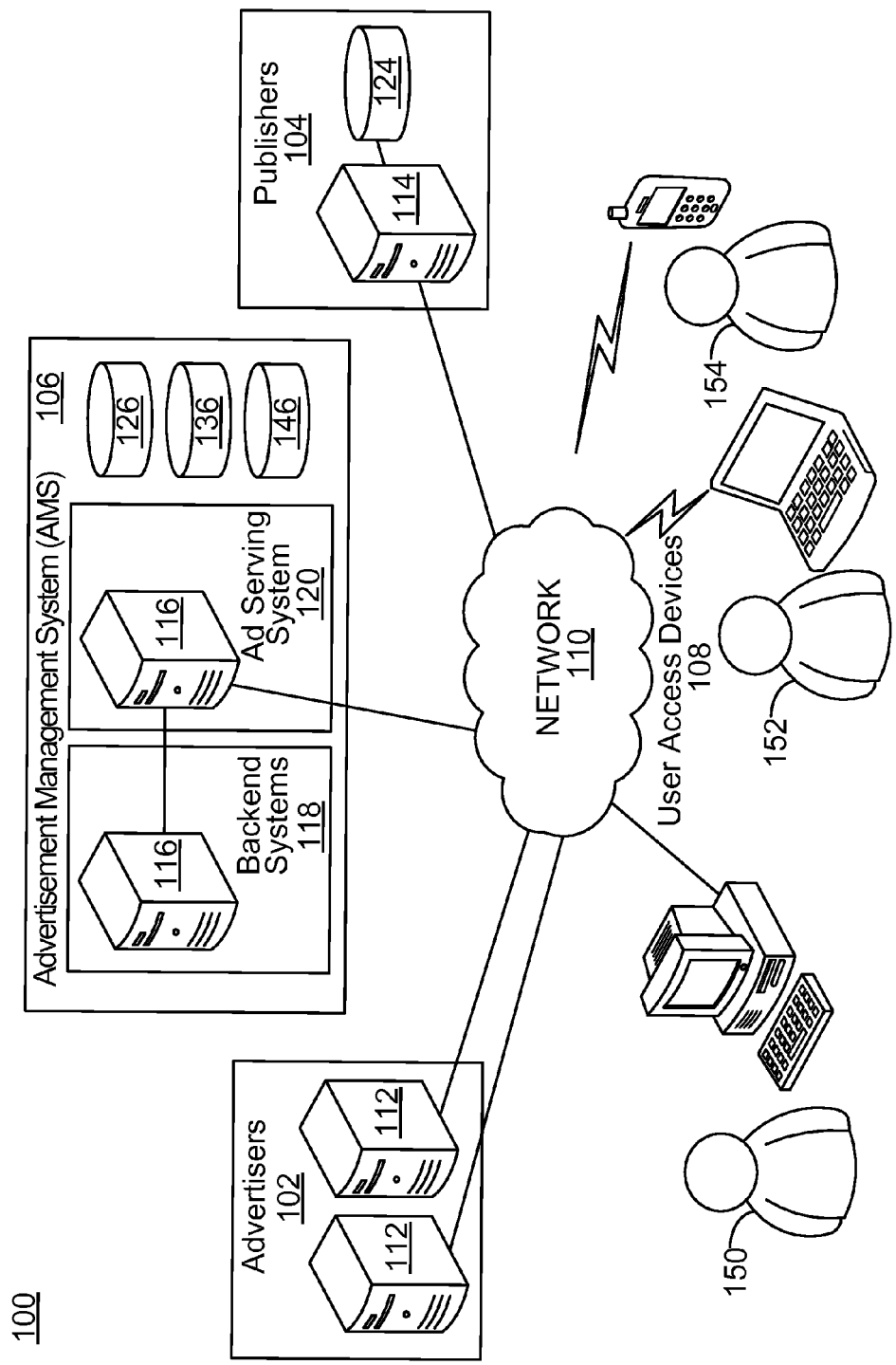
FIG. 1 is a diagram depicting an example advertising environment.

Although specific features of various embodiments may be shown in some drawings and not in others, this is for convenience only. Any feature of any drawing may be referenced and/or claimed in combination with any feature of any other drawing.

DETAILED DESCRIPTION OF THE DISCLOSURE

The following detailed description of implementations refers to the accompanying drawings. The same reference numbers in different drawings may identify the same or similar elements. Also, the following detailed description does not limit the claims.

This subject matter described herein relates generally to training of machine-learning architectures, such as gradient-descent machine learning architectures. As used herein, machine-learning systems are systems that can learn from data based upon the application of analytical methods, numerical methods, or any combination of such methods.

Specifically, the methods and systems described herein enable receiving a plurality of data elements wherein each data element is associated with a timestamp, determining a training window for each model layer of a layered stack of model layers, determining a plurality of training data elements for each training window by identifying the data elements with timestamps corresponding to each of the training windows, identifying a previous checkpoint for each model layer wherein the previous checkpoint for each model layer is generated by a parent model layer, training each model layer with the determined training data elements for each model layer and the identified previous checkpoint for each model layer, generating a plurality of current checkpoints wherein each current checkpoint of the plurality of current checkpoints is associated with a model layer, and storing the plurality of current checkpoints at the memory.

In many examples, machine-learning systems can learn to make inferences regarding new data based upon previous analysis of other data. Machine-learning architectures may be used to create adaptive models based on data including, for example, conversion data. Conversion data may indicate actions or inactions of potential customer of an online advertiser ("user"). More specifically, conversion data may include information regarding conversion activities including clicks, purchases, and other interactions with the online advertiser. In many examples, conversion data may include information related to the user, the advertiser, the context of the conversion, and the location and time of the conversion. Such conversion data may be analyzed to determine likely patterns of conversions for future online advertising.

Although machine-learning systems may be used for purely analytical purposes, at least some machine-learning systems are used to make operational decisions. For example, in the case of online advertising, machine-learning systems learning from conversion data can assist in the serving and management of online advertising campaigns. Improved knowledge regarding the likely patterns of conversions for future online advertising may assist in the enhancement of serving and managing online advertising campaigns.

Whether machine-learning systems are used to make operational decisions or not, it is desirable that machine-learning systems balance at least three distinct considerations to be useful in operational or analytical capacities. First, it is important that the data set which is used to facilitate machine-learning or "training" be as complete as possible. To the degree that data is not available to a machine-learning system, the models developed by such systems may be less accurate than possible based upon the presumption that machine-learning improves with a broader scope of data. Accordingly, when data arrives asynchronously, it may be desirable to wait for late-arriving data before processing a range of training data to train the model.

Secondly, it is important that the models generated by machine-learning systems be stable in order to be usable in operational contexts. Any arrival of data will cause the model to be retrained and changed. If data arrives asynchronously, the late-arriving data may lead to changes in the trained model. This poses a problem for such training systems because the model trains over a particular range of time and then retrains due to the late-arriving data. If the model is used for operational decision-making, the impact is that the model may indicate one decision based upon a particular set of data and then may indicate a different decision upon receipt and training with late-arriving data.

Thirdly, it is important that the models be as current and responsive to the environment as possible. In some cases, the characteristics of data which the machine-learning system is learning on can change substantially. In the example of machine-learning on conversion data, a particular change in the advertisements, consumer behavior, or available products and services may significantly alter the conversion data and accordingly effect a change in the model trained on the conversion data.

The considerations of stability and completeness of data could be accommodated by applying a delay period before a machine-learning system processes data. In other words, by waiting for substantially all training data to arrive, considerations of stability and completeness of data may be accommodated. However, such a delay period does not accommodate the consideration of currency. This is because in at least some cases, waiting for substantially all training data to arrive may prevent responsiveness to changes in the environment. In other words, during such a delay period, conditions in the environment may have changed but the model does not detect the change for some interval, or duration.

The methods and systems described herein address the three considerations by training machine-learning architectures with the use of a layered training model. The layered training model includes a stack of models with distinct delay periods. Each model in the stack of models relates to at least one other model in a parent-child relationship.

In machine-learning architectures, it is important to distinguish between the times of events. The time that an event occurs that results in generation of training data may be referred to as an "event time". In the case of some data including conversion data, the events may be tied to a reference event such as the display of an advertisement. The time of the reference event may be referred to as "reference time." The time that the data is received by the machine-learning system may be referred to as "receiving time." The time that the data is trained upon may be referred to as "training time." The current time of the system may be referred to as "current time" or "wall time".

The lowest model layer of the stack has the longest delay period to receive and process late-arriving data. In other words, the lowest model layer will train on data with the longest delays between event time and receiving time and accordingly the largest training windows. In one example, the lowest model layer may incorporate training data over a training window in excess of ninety days to train the model for the bottom model layer. Once the lowest model layer of the stack trained with all available training data over the designated training window, it commits the model for the bottom model layer and creates a checkpoint.

As used herein, "checkpoints" or "snapshots" refer to the state of the trained model layer at the time that the checkpoint is created. The checkpoint may be, for example, a best-fit for the training data. In another example, a checkpoint may represent, more specifically, parameters for the state of the model. In at least some examples, the parameters may be further simplified or reduced to accommodate processing by, for example, a synchronizing server or a child model layer.

In one example embodiment, the bottom model layer restarts training after creating a checkpoint. In alternative embodiments where late-arriving data is guaranteed not to arrive beyond the bottom layer's training delay or where such late-arriving data may safely be ignored, the bottom model layer does not restart training after creating a checkpoint but rather continually trains and writes checkpoints. The checkpoint is used as a reference for the training of a child model layer of the bottom model layer. Accordingly, the bottom model layer is a parent to the child model layer of the bottom model layer.

The child model layer of the bottom model layer has a more recent training window than the bottom model layer. The child model layer incorporates training data with event times within that training window. The child model layer incorporates training data over a shorter training window and trains on any data arriving within that delay period. In one example, the child model layer of the bottom model layer may incorporate training data where the training data has event times between ninety and forty-five days prior to the time the layer was initialized, while training the model for the child model layer of the bottom model layer. Once the child model layer of the bottom model layer has incorporated training data for the designated delay period (e.g., ninety days to forty-five days), the child model layer of the bottom model layer trains the model for the child model layer of the bottom model layer and creates a second checkpoint. The second checkpoint is used as a reference for training of a child model layer of the child model layer of the bottom model layer. Accordingly, the child model layer of the bottom model layer is a parent of the child model layer of the child model layer of the bottom model layer.

The stack of models may include a plurality of child model layers similar to the child model layers described above. In general, each model layer trains on data and incorporates late arriving data up to a duration specific to the model layer. After training over that period, each model layer generates a checkpoint which may be used by a child model layer to begin training. As each model layer has a distinct training window, checkpoints may not be created synchronously. Rather, checkpoints are created as soon as each model layer has trained over its training window. Accordingly, checkpoint write times will vary depending on model layer. The stack of models also includes a top model layer. The top model layer is a child model layer which is the highest model layer in the stack of model layers. Accordingly, the top model layer has no child model layers and has the shortest delay period. The top model layer may generate a checkpoint but it is not used to train a child model layer unless or until a new child model layer is added.

It is important to note that late-arriving data must be identified by first identifying the period to which it pertains. For example, at a particular point in time, for example Jan. 1, 2015, a plurality of conversion data may be received by a system. Each element of the conversion data may be associated with a different reference event. For example, the Jan. 1, 2015 data may include conversion data associated with Oct. 1, 2014, Nov. 1, 2014, and Dec. 1, 2014. In other words, elements of the conversion data may be approximately ninety days old, sixty days old, and thirty days old. Accordingly, in this example, the conversion data which is ninety days old would be used to train the bottom model on Jan. 1, 2015 but is not immediately incorporated into any child model layers. The conversion data which is sixty days old is used to train the bottom model layer until approximately Feb. 1, 2015. The conversion data which is thirty days old is used to train the child model layer of the bottom model layer, until current time has advanced enough for the conversion data to cross into the bottom model layer's training window, at which time the conversion data is used to train the bottom model layer instead.

A training computing device initially generates a layered stack of model layers where each model layer has a layer depth and a training window and an associated training delay. The bottom model layer has the lowest layer depth and a training window which is the longest training window in the stack of model layers and the top model layer has the highest layer depth and a training window which is the shortest training window in the stack of model layers. The training computing device determines a training window for each model layer of a layered stack of model layers. The training window is determined by determining a layer depth of each model layer, retrieving a training model configuration wherein the training model configuration designates a training delay record associated with each layer depth, identifying a training delay associated with the layer depth of each model layer based upon the training model configuration, and calculating a training window based upon the training delay for each model layer. The training computing device receives a plurality of data elements. Each data element is associated with an event time. The training computing device determines a plurality of training data elements for each training window by identifying the data elements with timestamps corresponding to each of the training windows. The beginning of the training window is also typically the end of the training window for the parent layer model that produced the previous checkpoint, or a time just after the last event in that checkpoint. The end of the training window is the current time adjusted by the training delay. In at least some examples, the bottom model layer has no end time for its training window.

With the exception of the bottom layer, which begins training from an empty model, the training computing device identifies a previous checkpoint for each model layer. The previous checkpoint for each model layer is generated by a parent model layer. If no previous checkpoint is available, the training computing device waits until the parent model layer generates a previous checkpoint.

The training computing device trains each model layer with the determined training data elements for each model layer and the identified previous checkpoint for each model layer, if any. Note again that in many examples, the bottom model layer does not have a previous checkpoint from which to train. The training computing device trains by applying at least one machine-learning algorithm. The machine-learning algorithm may be any suitable machine-learning algorithm for use with the systems and methods described. In the example embodiment, the machine-learning algorithm is a gradient-descent optimization algorithm. Alternately, the machine-learning algorithm may be any machine-learning algorithm or training procedure including, without limitation, a supervised learning algorithm, a semi-supervised learning algorithm, an unsupervised learning algorithm, and a reinforcement algorithm.

Upon training the model layer for the appropriate training duration (i.e., until the training window is elapsed), the training computing device generates a checkpoint of the model layer for each model layer. As described herein, because training windows vary for each model layer, checkpoints may be written asynchronously. The training computing device determines the appropriate training duration by determining a layer depth for each model layer, retrieving a model configuration designating a training duration associated with each layer depth, identifying a training duration associated with the layer depth of each model layer based upon the training model configuration and determining the training duration based upon the layer depth and the model configuration. The training computing device restarts the training process for the model layer, based upon the most recent parent layer checkpoint. In at least some examples, some model layers may not restart the training process. For example, bottom model layers train over the longest training window and do not rely upon parent model layers to create a checkpoint on which to train. Accordingly, restarting bottom model layers may take a long time. As such, it may be desirable for model layers such as the bottom layer to continuously train and write checkpoints without restarting. The training computing device may also purge at least one preceding checkpoint for the model layer if such a preceding checkpoint exists.

The training computing device also trains a child model layer based upon the checkpoint. The child model layer has a lower layer depth (i.e., it is relatively shallower in the stack) than the model layer. The child model layer also has a shorter training window than the model layer. In other words, the child model layer incorporates training data from a more recent window of event time, and may be exposed to an increased amount of late-arriving data compared to the bottom model layer. Initially, all model layers are created and wait for checkpoints of parents to become available before training. Therefore, after the bottom model layer immediately begins training, and writes a checkpoint, a child model layer of bottom model layer may begin training. Accordingly, the top model layer is the last model layer to begin training.

The training computing device also synchronizes at least one current checkpoint with an external server whenever a current checkpoint is produced that may be used for synchronization. The external server may be an operations server such as a content server, an analytics server, and a hybrid thereof. The external server serves at least partially based upon the synchronized current checkpoint.

As suggested above, the layered stack of models applies a hierarchy wherein each model layer is a parent to the model layer immediately above it, with the exception that the top model layer is not a parent to any model layer. Accordingly, the designated parent model layer and the child model layer are in a parent-child relationship. Alternately, in some examples, the layered stack of models may apply a hierarchy wherein each model layer is a parent to at least one model layer immediately above it. In such examples where parent model layers may have multiple child model layers, the layered stack of models may substantially represent a tree-like hierarchy.

The training computing device stores the plurality of current checkpoints at a memory. As indicated above, the storing may occur asynchronously because of the varying training delays and training windows. Each of the plurality of current checkpoints is associated with their respective model layers and layer depths. The training computing device additionally validates each current checkpoint of the plurality of current checkpoints against the plurality of data elements. Upon such validation, current checkpoints are stored in memory. Accordingly, storing current checkpoints for each model layer may occur asynchronously. In other words, current checkpoints may be stored at different times for each model layer.

In the example embodiment, the plurality of data elements represents conversion data. The conversion data represents conversion activity associated with serving online advertisements. In other examples, the plurality of data elements may represent any other kind of data used for machine-learning without limitation.

As used herein, an element or step recited in the singular and proceeded with the word "a" or "an" should be understood as not excluding plural elements or steps, unless such exclusion is explicitly recited. Furthermore, references to "one embodiment" of the subject matter disclosed herein are not intended to be interpreted as excluding the existence of additional embodiments that also incorporate the recited features.

The methods and systems described herein may be implemented using computer programming or engineering techniques including computer software, firmware, hardware or any combination or subset thereof, wherein the technical effects may be achieved by performing one of the following steps: (a) receiving a plurality of data elements wherein each data element is associated with a timestamp; (b) determining a training window for each model layer of a layered stack of model layers; (c) determining a plurality of training data elements for each training window by identifying the data elements with timestamps corresponding to each of the training windows; (d) identifying a previous checkpoint for each model layer if the previous checkpoint for each model layer exists, wherein the previous checkpoint for each model layer is generated by a parent model layer; (e) training each model layer with the determined training data elements for each model layer and the identified previous checkpoint, if any, for each model layer; (f) generating a plurality of current checkpoints, wherein each current checkpoint of the plurality of current checkpoints is associated with a model layer; (g) storing the plurality of current checkpoints at the memory; (h) adapting each model layer to the determined training data elements for each model layer by applying at least one machine-learning algorithm; (i) determining a layer depth of each model layer; (j) retrieving a training model configuration wherein the training model configuration designates a training delay record associated with each layer depth; (k) identifying a training delay associated with the layer depth of each model layer based upon the training model configuration; (l) calculating a training window based upon the training delay for each model layer; (m) synchronizing an external server with at least one current checkpoint associated with at least one model layer, wherein the external server serves based at least partially on the synchronized current checkpoint; (n) determining a layer depth for each model layer; (o) retrieving a training model configuration wherein the training model configuration designates a training duration associated with each layer depth; (p) identifying a training duration associated with the layer depth of each model layer based upon the training model configuration; (q) training the model layer for the identified training duration; (r) processing each model layer into the current checkpoint; (s) purging the previous checkpoint for each model layer; (t) retraining each model layer; (u) validating each checkpoint of the plurality of current checkpoints against the plurality of data elements; (v) storing validated checkpoints of the plurality of current checkpoints at the memory; and (w) receiving a plurality of conversion data, wherein the conversion data represents conversion activity associated with serving online advertisements.

FIG. 1 is a diagram depicting an example online content environment 100. Online content environment 100 may be used in the context of serving online advertisements to a user, including a user of a mobile computing device, in combination with online publications. With reference to FIG. 1, example environment 100 may include one or more advertisers 102 (i.e., online content providers), one or more publishers 104, an advertisement management system (AMS) 106, and one or more user access devices 108, which may be coupled to a network 110. User access devices are used by users 150, 152, and 154. Each of the elements 102, 104, 106, 108 and 110 in FIG. 1 may be implemented or associated with hardware components, software components, or firmware components or any combination of such components. The elements 102, 104, 106, 108 and 110 can, for example, be implemented or associated with general purpose servers, software processes and engines, and/or various embedded systems. The elements 102, 104, 106 and 110 may serve, for example, as an advertisement distribution network. While reference is made to distributing advertisements, the environment 100 can be suitable for distributing other forms of content including other forms of sponsored content. AMS 106 may also be referred to as a content management system 106.

The advertisers 102 may include any entities that are associated with advertisements ("ads"). An advertisement or an "ad" refers to any form of communication in which one or more products, services, ideas, messages, people, organizations or other items are identified and promoted (or otherwise communicated). Ads are not limited to commercial promotions or other communications. An ad may be a public service announcement or any other type of notice, such as a public notice published in printed or electronic press or a broadcast. An ad may be referred to as sponsored content.

Ads may be communicated via various mediums and in various forms. In some examples, ads may be communicated through an interactive medium, such as the Internet, and may include graphical ads (e.g., banner ads), textual ads, image ads, audio ads, video ads, ads combining one of more of any of such components, or any form of electronically delivered advertisement. Ads may include embedded information, such as embedded media, links, meta-information, and/or machine executable instructions. Ads could also be communicated through RSS (Really Simple Syndication) feeds, radio channels, television channels, print media, and other media.

The term "ad" can refer to both a single "creative" and an "ad group." A creative refers to any entity that represents one ad impression. An ad impression refers to any form of presentation of an ad such that it is viewable/receivable by a user. In some examples, an ad impression may occur when an ad is displayed on a display device of a user access device. An ad group refers, for example, to an entity that represents a group of creatives that share a common characteristic, such as having the same ad selection and recommendation criteria. Ad groups can be used to create an ad campaign.

The advertisers 102 may provide (or be otherwise associated with) products and/or services related to ads. The advertisers 102 may include or be associated with, for example, retailers, wholesalers, warehouses, manufacturers, distributors, health care providers, educational establishments, financial establishments, technology providers, energy providers, utility providers, or any other product or service providers or distributors.

The advertisers 102 may directly or indirectly generate, and/or maintain ads, which may be related to products or services offered by or otherwise associated with the advertisers. The advertisers 102 may include or maintain one or more data processing systems 112, such as servers or embedded systems, coupled to the network 110. The advertisers 102 may include or maintain one or more processes that run on one or more data processing systems.

The publishers 104 may include any entities that generate, maintain, provide, present and/or otherwise process content in the environment 100. "Publishers," in particular, include authors of content, wherein authors may be individual persons, or, in the case of works made for hire, the proprietor(s) who hired the individual(s) responsible for creating the online content. The term "content" refers to various types of web-based, software application-based and/or otherwise presented information, including articles, discussion threads, reports, analyses, financial statements, music, video, graphics, search results, web page listings, information feeds (e.g., RSS feeds), television broadcasts, radio broadcasts, printed publications, or any other form of information that may be presented to a user using a computing device such as one of user access devices 108.

In some implementations, the publishers 104 may include content providers with an Internet presence, such as online publication and news providers (e.g., online newspapers, online magazines, television websites, etc.), online service providers (e.g., financial service providers, health service providers, etc.), and the like. The publishers 104 can include software application providers, television broadcasters, radio broadcasters, satellite broadcasters, and other content providers. One or more of the publishers 104 may represent a content network that is associated with the AMS 106.

The publishers 104 may receive requests from the user access devices 108 (or other elements in the environment 100) and provide or present content to the requesting devices. The publishers may provide or present content via various mediums and in various forms, including web based and non-web based mediums and forms. The publishers 104 may generate and/or maintain such content and/or retrieve the content from other network resources.

In addition to content, the publishers 104 may be configured to integrate or combine retrieved content with additional sets of content, for example ads, that are related or relevant to the retrieved content for display to users 150, 152, and 154. As discussed further below, these relevant ads may be provided from the AMS 106 and may be combined with content for display to users 150, 152, and 154. In some examples, the publishers 104 may retrieve content for display on a particular user access device 108 and then forward the content to the user access device 108 along with code that causes one or more ads from the AMS 106 to be displayed to the user 150, 152, or 154. As used herein, user access devices 108 may also be known as customer computing devices 108. In other examples, the publishers 104 may retrieve content, retrieve one or more relevant ads (e.g., from the AMS 106 or the advertisers 102), and then integrate the ads and the article to form a content page for display to the user 150, 152, or 154.

As noted above, one or more of the publishers 104 may represent a content network. In such an implementation, the advertisers 102 may be able to present ads to users through this content network.

The publishers 104 may include or maintain one or more data processing systems 114, such as servers or embedded systems, coupled to the network 110. They may include or maintain one or more processes that run on data processing systems. In some examples, the publishers 104 may include one or more content repositories 124 for storing content and other information.

The AMS 106 manages ads and provides various services to the advertisers 102, the publishers 104, and the user access devices 108. The AMS 106 may store ads in an ad repository 126 and facilitate the distribution or selective provision and recommendation of ads through the environment 100 to the user access devices 108. In some configurations, the AMS 106 may include or access functionality associated with managing online content and/or online advertisements, particularly functionality associated with serving online content and/or online advertisements to mobile computing devices.

The AMS 106 may include one or more data processing systems 116, such as servers or embedded systems, coupled to the network 110. It can also include one or more processes, such as server processes. In some examples, the AMS 106 may include an ad serving system 120 and one or more backend processing systems 118. The ad serving system 120 may include one or more data processing systems 116 and may perform functionality associated with delivering ads to publishers or user access devices 108. The backend processing systems 118 may include one or more data processing systems 116 and may perform functionality associated with identifying relevant ads to deliver, processing various rules, performing filtering processes, generating reports, maintaining accounts and usage information, and other backend system processing. The AMS 106 can use the backend processing systems 118 and the ad serving system 120 to selectively recommend and provide relevant ads from the advertisers 102 through the publishers 104 to the user access devices 108.

The AMS 106 may include or access one or more crawling, indexing and searching modules (not shown). These modules may browse accessible resources (e.g., the World Wide Web, publisher content, data feeds, etc.) to identify, index and store information. The modules may browse information and create copies of the browsed information for subsequent processing. The modules may also check links, validate code, harvest information, and/or perform other maintenance or other tasks.

Searching modules may search information from various resources, such as the World Wide Web, publisher content, intranets, newsgroups, databases, and/or directories. The search modules may employ one or more known search or other processes to search data. In some implementations, the search modules may index crawled content and/or content received from data feeds to build one or more search indices. The search indices may be used to facilitate rapid retrieval of information relevant to a search query.

The AMS 106 may include one or more interface or frontend modules for providing the various features to advertisers, publishers, and user access devices. For example, the AMS 106 may provide one or more publisher front-end interfaces (PFEs) for allowing publishers to interact with the AMS 106. The AMS 106 may also provide one or more advertiser frontend interfaces (AFEs) for allowing advertisers to interact with the AMS 106. In some examples, the front-end interfaces may be configured as web applications that provide users with network access to features available in the AMS 106.

The AMS 106 provides various advertising management features to the advertisers 102. The AMS 106 advertising features may allow users to set up user accounts, set account preferences, create ads, select keywords for ads, create campaigns or initiatives for multiple products or businesses, view reports associated with accounts, analyze costs and return on investment, selectively identify customers in different regions, selectively recommend and provide ads to particular publishers, analyze financial information, analyze ad performance, estimate ad traffic, access keyword tools, add graphics and animations to ads, etc.

The AMS 106 may allow the advertisers 102 to create ads and input keywords or other ad placement descriptors for which those ads will appear. In some examples, the AMS 106 may provide ads to user access devices or publishers when keywords associated with those ads are included in a user request or requested content. The AMS 106 may also allow the advertisers 102 to set bids for ads. A bid may represent the maximum amount an advertiser is willing to pay for each ad impression, user click-through of an ad or other interaction with an ad. A click-through can include any action a user takes to select an ad. Other actions include haptic feedback or gyroscopic feedback to generate a click-through. The advertisers 102 may also choose a currency and monthly budget.

The AMS 106 may also allow the advertisers 102 to view information about ad impressions, which may be maintained by the AMS 106. The AMS 106 may be configured to determine and maintain the number of ad impressions relative to a particular website or keyword. The AMS 106 may also determine and maintain the number of click-throughs for an ad as well as the ratio of click-throughs to impressions.

The AMS 106 may also allow the advertisers 102 to select and/or create conversion types for ads. A "conversion" may occur when a user consummates a transaction related to a given ad. A conversion could be defined to occur when a user clicks, directly or implicitly (e.g., through haptic or gyroscopic feedback), on an ad, is referred to the advertiser's web page, and consummates a purchase there before leaving that web page. In another example, a conversion could be defined as the display of an ad to a user and a corresponding purchase on the advertiser's web page within a predetermined time (e.g., seven days). The AMS 106 may store conversion data and other information in a conversion data repository 136.

The AMS 106 may allow the advertisers 102 to input description information associated with ads. This information could be used to assist the publishers 104 in determining ads to publish. The advertisers 102 may additionally input a cost/value associated with selected conversion types, such as a five dollar credit to the publishers 104 for each product or service purchased.

The AMS 106 may provide various features to the publishers 104. The AMS 106 may deliver ads (associated with the advertisers 102) to the user access devices 108 when users access content from the publishers 104. The AMS 106 can be configured to deliver ads that are relevant to publisher sites, site content, and publisher audiences.

In some examples, the AMS 106 may crawl content provided by the publishers 104 and deliver ads that are relevant to publisher sites, site content and publisher audiences based on the crawled content. The AMS 106 may also selectively recommend and/or provide ads based on user information and behavior, such as particular search queries performed on a search engine website, or a designation of an ad for subsequent review, as described herein, etc. The AMS 106 may store user-related information in a general database 146. In some examples, the AMS 106 can add search services to a publisher site and deliver ads configured to provide appropriate and relevant content relative to search results generated by requests from visitors of the publisher site. A combination of these and other approaches can be used to deliver relevant ads.

The AMS 106 may allow the publishers 104 to search and select specific products and services as well as associated ads to be displayed with content provided by the publishers 104. For example, the publishers 104 may search through ads in the ad repository 126 and select certain ads for display with their content.

The AMS 106 may be configured to selectively recommend and provide ads created by the advertisers 102 to the user access devices 108 directly or through the publishers 104. The AMS 106 may selectively recommend and provide ads to a particular publisher 104 (as described in further detail herein) or a requesting user access device 108 when a user requests search results or loads content from the publisher 104.

In some implementations, the AMS 106 may manage and process financial transactions among and between elements in the environment 100. For example, the AMS 106 may credit accounts associated with the publishers 104 and debit accounts of the advertisers 102. These and other transactions may be based on conversion data, impressions information and/or click-through rates received and maintained by the AMS 106.

"Computing devices", for example user access devices 108, may include any devices capable of receiving information from the network 110. The user access devices 108 could include general computing components and/or embedded systems optimized with specific components for performing specific tasks. Examples of user access devices include personal computers (e.g., desktop computers), mobile computing devices, cell phones, smart phones, head-mounted computing devices, media players/recorders, music players, game consoles, media centers, media players, electronic tablets, personal digital assistants (PDAs), television systems, audio systems, radio systems, removable storage devices, navigation systems, set top boxes, other electronic devices and the like. The user access devices 108 can also include various other elements, such as processes running on various machines.

The network 110 may include any element or system that facilitates communications among and between various network nodes, such as elements 108, 112, 114 and 116. The network 110 may include one or more telecommunications networks, such as computer networks, telephone or other communications networks, the Internet, etc. The network 110 may include a shared, public, or private data network encompassing a wide area (e.g., WAN) or local area (e.g., LAN). In some implementations, the network 110 may facilitate data exchange by way of packet switching using the Internet Protocol (IP). The network 110 may facilitate wired and/or wireless connectivity and communication.

For purposes of explanation only, certain aspects of this disclosure are described with reference to the discrete elements illustrated in FIG. 1. The number, identity and arrangement of elements in the environment 100 are not limited to what is shown. For example, the environment 100 can include any number of geographically-dispersed advertisers 102, publishers 104 and/or user access devices 108, which may be discrete, integrated modules or distributed systems. Similarly, the environment 100 is not limited to a single AMS 106 and may include any number of integrated or distributed AMS systems or elements.

Furthermore, additional and/or different elements not shown may be contained in or coupled to the elements shown in FIG. 1, and/or certain illustrated elements may be absent. In some examples, the functions provided by the illustrated elements could be performed by less than the illustrated number of components or even by a single element. The illustrated elements could be implemented as individual processes running on separate machines or a single process running on a single machine.

Figure 2:
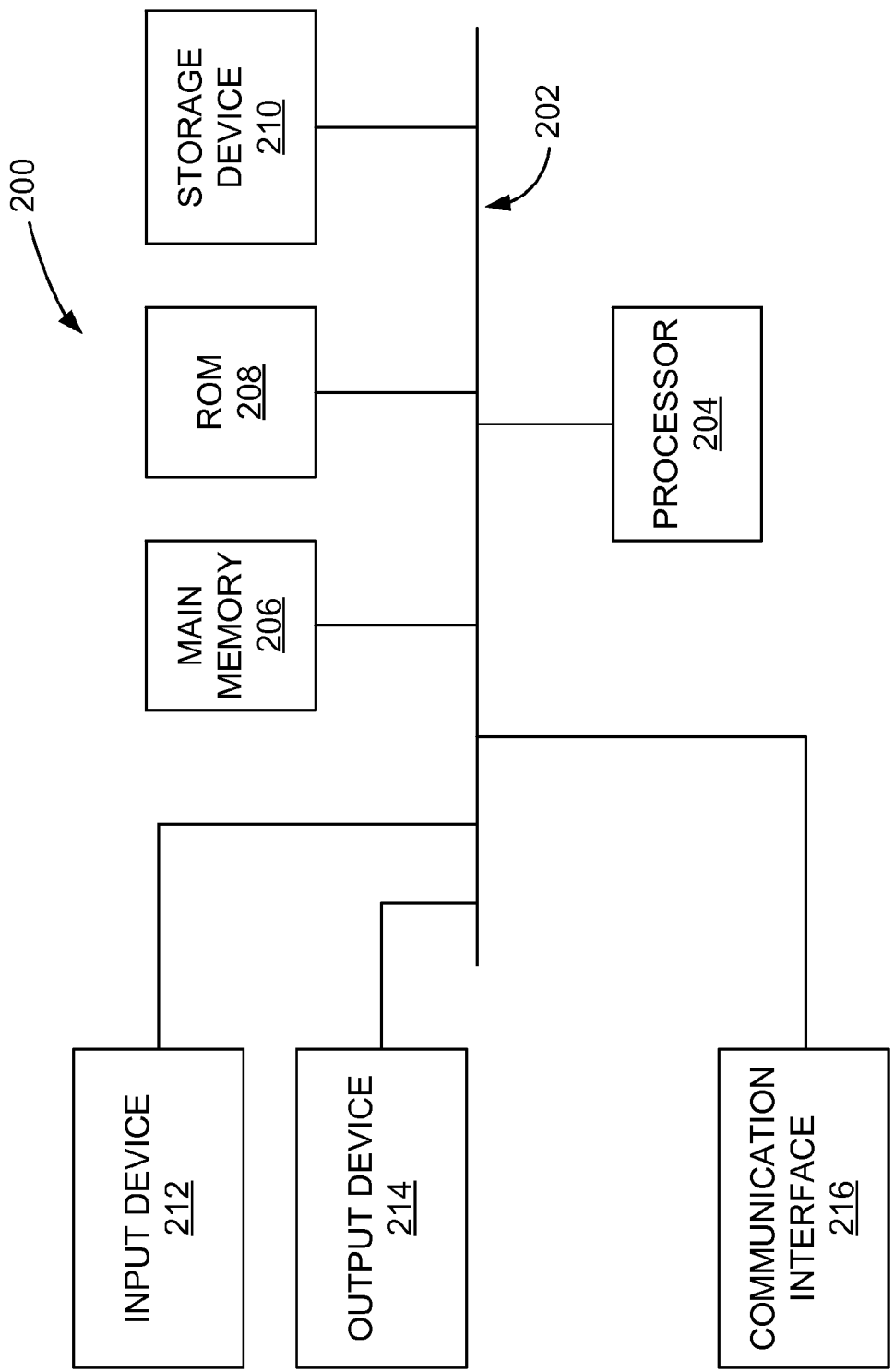
FIG. 2 is a block diagram of a computing device, used for layered training of machine-learning architectures, as shown in the advertising environment of FIG. 1.

FIG. 2 is a block diagram of a computing device 200 used for automatically delivering dynamic online content to a mobile computing device, as shown in advertising environment 100 (shown in FIG. 1).

FIG. 2 shows an example of a generic computing device 200 intended to represent various forms of digital computers, such as laptops, desktops, workstations, personal digital assistants, servers, blade servers, mainframes, and other appropriate computers. Computing device 200 is also intended to represent various forms of mobile devices, such as personal digital assistants, cellular telephones, smart phones, and other similar computing devices. The components shown here, their connections and relationships, and their functions, are meant to be examples only, and are not meant to limit implementations of the subject matter described and/or claimed in this document.

In the example embodiment, computing device 200 could be user access device 108 or any of data processing devices 112, 114, or 116 (shown in FIG. 1). Computing device 200 may include a bus 202, a processor 204, a main memory 206, a read only memory (ROM) 208, a storage device 210, an input device 212, an output device 214, and a communication interface 216. Bus 202 may include a path that permits communication among the components of computing device 200.

Processor 204 may include any type of conventional processor, microprocessor, or processing logic that interprets and executes instructions. Processor 204 can process instructions for execution within the computing device 200, including instructions stored in the memory 206 or on the storage device

210 to display graphical information for a GUI on an external input/output device, such as display 214 coupled to a high speed interface. In other implementations, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system).

Main memory 206 may include a random access memory (RAM) or another type of dynamic storage device that stores information and instructions for execution by processor 204. ROM 208 may include a conventional ROM device or another type of static storage device that stores static information and instructions for use by processor 204. Main memory 206 stores information within the computing device 200. In one implementation, main memory 206 is a volatile memory unit or units. In another implementation, main memory 206 is a non-volatile memory unit or units. Main memory 206 may also be another form of computer-readable medium, such as a magnetic or optical disk.

Storage device 210 may include a magnetic and/or optical recording medium and its corresponding drive. The storage device 210 is capable of providing mass storage for the computing device 200. In one implementation, the storage device 210 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as main memory 206, ROM 208, the storage device 210, or memory on processor 204.

The high speed controller manages bandwidth-intensive operations for the computing device 200, while the low speed controller manages lower bandwidth-intensive operations. Such allocation of functions is for purposes of example only. In one implementation, the high-speed controller is coupled to main memory 206, display 214 (e.g., through a graphics processor or accelerator), and to high-speed expansion ports, which may accept various expansion cards (not shown). In the implementation, low-speed controller is coupled to storage device 210 and low-speed expansion port. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Input device 212 may include a conventional mechanism that permits computing device 200 to receive commands, instructions, or other inputs from a user 150, 152, or 154, including visual, audio, touch, button presses, stylus taps, etc. Additionally, input device may receive location information. Accordingly, input device 212 may include, for example, a camera, a microphone, one or more buttons, a touch screen, and/or a GPS receiver. Output device 214 may include a conventional mechanism that outputs information to the user, including a display (including a touch screen) and/or a speaker. Communication interface 216 may include any transceiver-like mechanism that enables computing device 200 to communicate with other devices and/or systems. For example, communication interface 216 may include mechanisms for communicating with another device or system via a network, such as network 110 (shown in FIG. 1).

As described herein, computing device 200 facilitates the presentation of content from one or more publishers, along with one or more sets of sponsored content, for example ads, to a user. Computing device 200 may perform these and other operations in response to processor 204 executing software instructions contained in a computer-readable medium, such as memory 206. A computer-readable medium may be defined as a physical or logical memory device and/or carrier wave. The software instructions may be read into memory 206 from another computer-readable medium, such as data storage device 210, or from another device via communication interface 216. The software instructions contained in memory 206 may cause processor 204 to perform processes described herein. Alternatively, hardwired circuitry may be used in place of or in combination with software instructions to implement processes consistent with the subject matter herein. Thus, implementations consistent with the principles of the subject matter disclosed herein are not limited to any specific combination of hardware circuitry and software.

The computing device 200 may be implemented in a number of different forms, as shown in the figure. For example, it may be implemented as a standard server, or multiple times in a group of such servers. It may also be implemented as part of a rack server system. In addition, it may be implemented in a personal computer such as a laptop computer. Each of such devices may contain one or more of computing device 200, and an entire system may be made up of multiple computing devices 200 communicating with each other.

The processor 204 can execute instructions within the computing device 200, including instructions stored in the main memory 206. The processor may be implemented as chips that include separate and multiple analog and digital processors. The processor may provide, for example, for coordination of the other components of the device 200, such as control of user interfaces, applications run by device 200, and wireless communication by device 200.

Computing device 200 includes a processor 204, main memory 206, ROM 208, an input device 212, an output device such as a display 214, a communication interface 216, among other components including, for example, a receiver and a transceiver. The device 200 may also be provided with a storage device 210, such as a microdrive or other device, to provide additional storage. Each of the components are interconnected using various buses, and several of the components may be mounted on a common motherboard or in other manners as appropriate.

Computing device 200 may communicate wirelessly through communication interface 216, which may include digital signal processing circuitry where necessary. Communication interface 216 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver. In addition, short-range communication may occur, such as using a Bluetooth, WiFi, or other such transceiver (not shown). In addition, a GPS (Global Positioning system) receiver module may provide additional navigation- and location-related wireless data to device 200, which may be used as appropriate by applications running on device 200.

Figure 3:
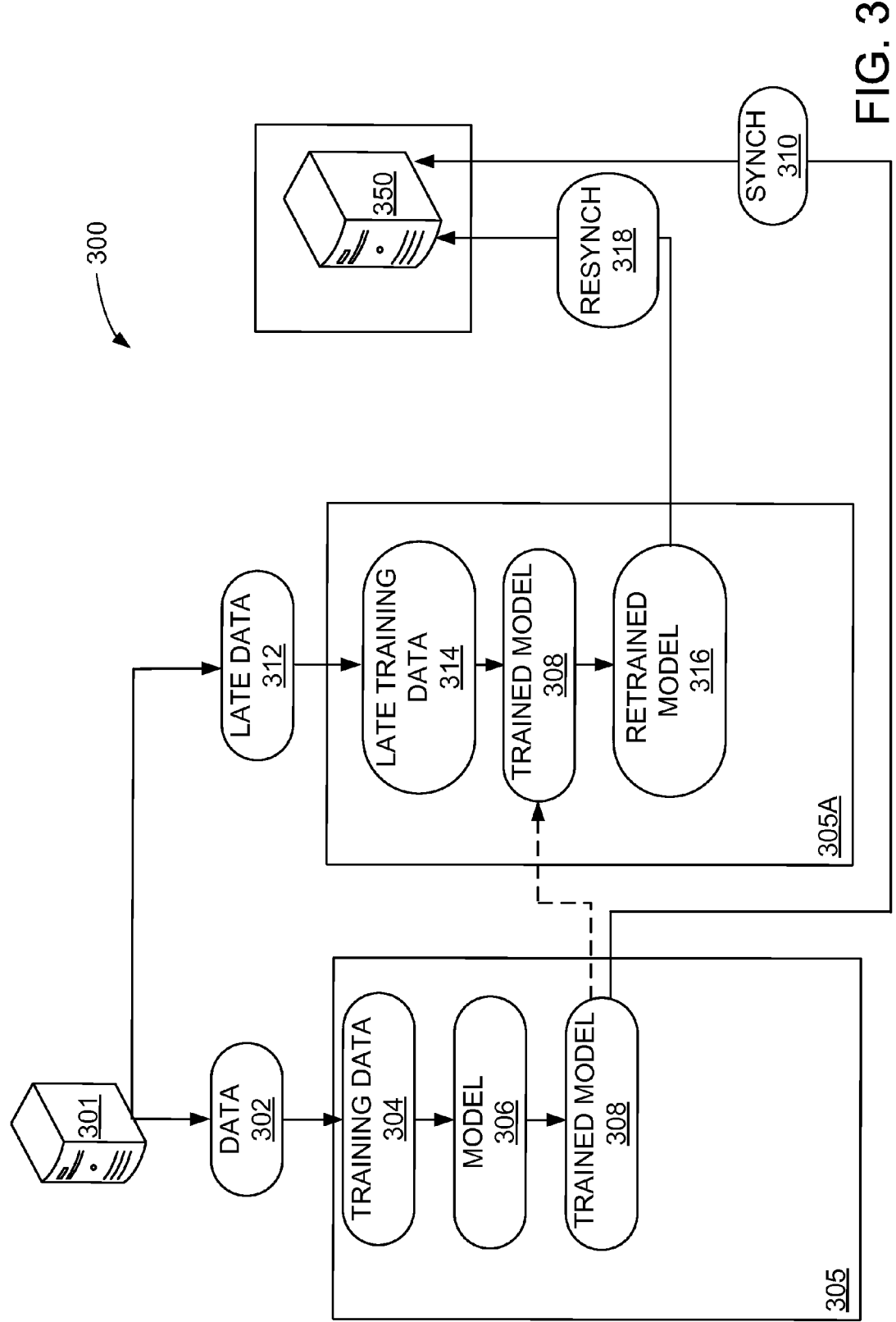
FIG. 3 is a known process of a typical training system for training machine-learned architectures that does not use the systems and methods described herein.

FIG. 3 is a known process of a typical training system 300 for training machine-learned architectures that does not use the systems and methods described herein. Training system 300 specifically does not use the layered-training method described herein. Instead, training system 300 trains using a single model 306. Accordingly, for the reasons described above, training system 300 faces difficulties with late-arriving data such as late data 312 because of the implications on late data 312 on completeness of data used to train a model, stability, and currency of data.

In training system 300, data 302 is received from a computer device 301. In the example embodiment, computer device 301 provides conversion data 302. Conversion data 302 is analyzed by backend system 305. More specifically, backend system 305 is a training computing device 305. Training computing device 305 parses data 302 into training data 304 which is applied to train model 306 and generate trained model 308. When data 302 is provided in a timely manner (relative to the reference-point of the conversion events), trained model 308 is highly accurate. However, when late data 312 exist in training system 300, trained model 308 does not reflect all possible data, but only a subset. Accordingly, when trained model 308 is synched 310 with ad server 350, synch 310 may not be reliable due to late data 312.

Training system 300 receives late data 312 after some delay. Late data 312 is received by training computing device 305A. Training computing device 305A represents training computing device 305 at a later point in time when late data 312 arrives. Late data 312 is parsed into late training data 314 and used to update trained model 308 into retrained model 316. Depending on the nature of late data 312 in relation to data 302, retrained model 316 may accordingly vary significantly from trained model 308. As a result, when retrained model 316 is resynched 318 with ad server 350, resynch 318 may be very different from synch 310. Accordingly, ad server 350 may determine significantly different operational decisions after synch 310 and after resynch 318. Accordingly, for the reasons shown, training system 300 experiences undesirable results when late data 312 is processed by training computing device 305.

Figure 4:
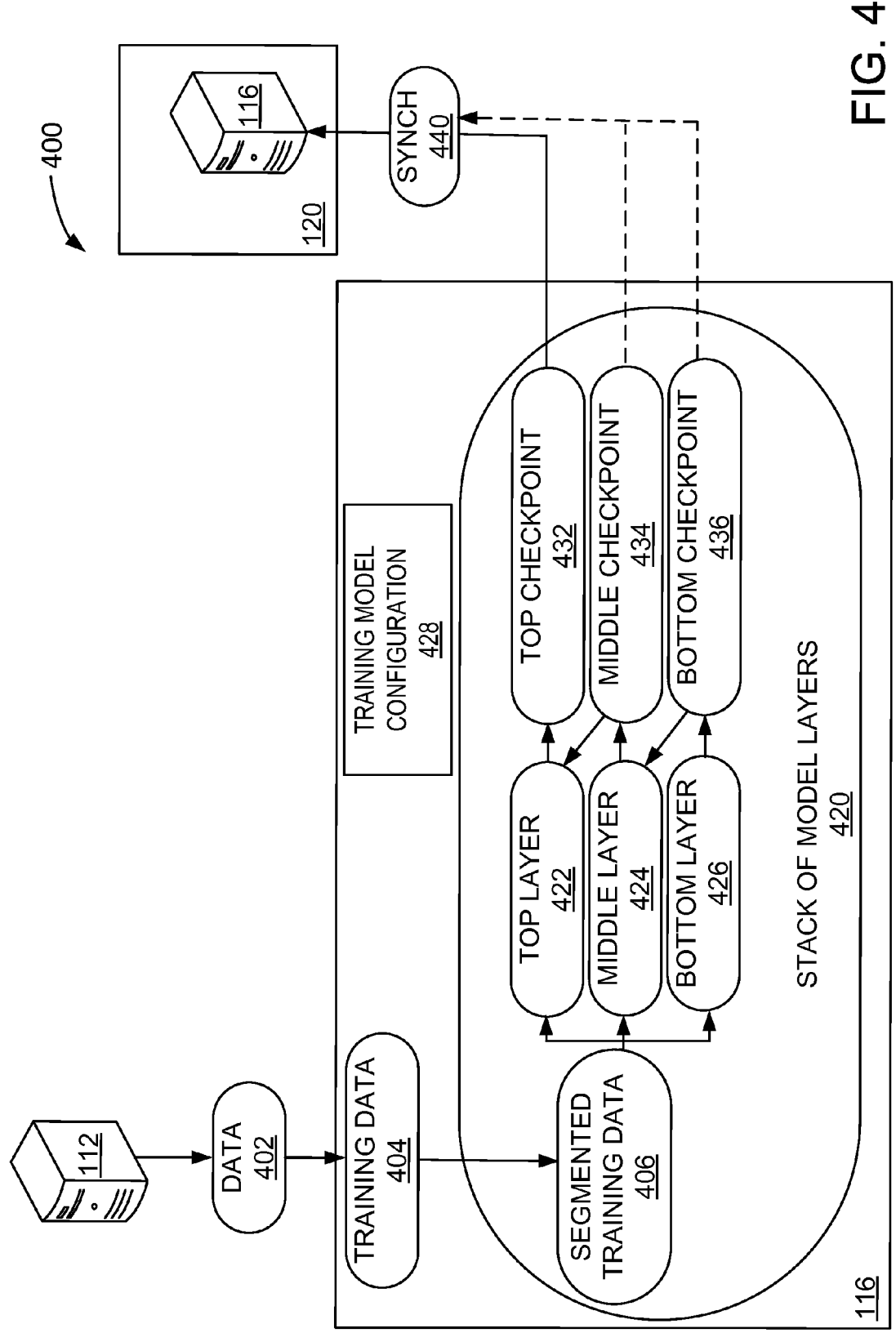
FIG. 4 is an example data flowchart of a training system using layered training for machine-learning architectures on the computing device of FIG. 1 in the advertising environment shown in FIG. 1.

FIG. 4 is an example data flowchart of a training system 400 using layered training for machine-learning architectures on training computing device 116 in advertising environment 100 (shown in FIG. 1). In contrast to training system 300, training system 400 uses a stack of model layers 420 for machine-learning. In the example embodiment, stack of model layers 420 includes three layers, top model layer 422, middle model layer 424, and bottom model layer 426. In alternative embodiments, any number of model layers 422, 424, and 426 may be included in stack of model layers 420. As described above, each model layer 422, 424, and 426 has a distinctive training window indicating which training data 404 may apply to each layer. In other words, each model layer 422, 424, and 426 will train on training data 404 provided that the training data 404 has a reference event corresponding to the training window for the particular model layer 422, 424, or 426. Further, each model layer 422, 424, and 426 trains for a training duration corresponding to the training window. After each model layer 422, 424, and 426 trains for its respective training duration, it writes a corresponding checkpoint 432, 434, and 436. Upon writing checkpoints 432, 434, and 436, model layers 422, 424, and 426 typically reset and begin training upon the checkpoint of the respective parent layer. However, as described above, due to the fact that bottom model layer 422 has no parent layer and has the longest training window, some model layers such as bottom model layer 422 may not retrain. Rather, such model layers will continuously train without resetting. Further, the value of resetting for an upper model layer comes from the fact that it may incorporate new data from a parent model layer's checkpoint. Again, as bottom model layer 422 has no parent model layer, it will not derive this value.

In operation, ad server 112 associated with advertisers 102 (shown in FIG. 1) sends data 402 to training computing device 116. In the example embodiment, data 402 is conversion data. In alternative embodiments, data 402 may be any data suitable for use in training machine-learning architectures. Data 402 is parsed by trainings server 116 into training data 404. Parsing data into training data 404 includes at least identifying a reference event associated with each data element in data 402.

Training computing device 116 retrieves training model configuration 428. Training model configuration 428 represents a configuration file defining the properties of training system 400 and, more specifically, stack of model layers 420. Training model configuration 428 includes training windows, training durations, and training identifiers for each model layer 422, 424, and 426. Training model configuration 428 identifies each model layer by depth of model layer 422, 424, and 426. In the example embodiment, bottom layer has a depth of "2", middle layer has a depth of "1", and top layer has a depth of "0". Accordingly, training computing device 116 retrieves training windows corresponding to each layer depth and, accordingly, each model layer 422, 424, and 426.

Training computing device 116 segments training data 404 into segmented training data 406 by applying parsed training data 404 to training windows determined for each model layer 422, 424, and 426. In at least some examples, segmented training data 406 may apply to more than one training window and more than one model layer 422, 424, and 426. In one example top model layer 422 starts training on middle checkpoint 434 and subsequently trains on segmented training data 406. Meanwhile, middle model layer 424, having previously supplied middle checkpoint 434 and having been subsequently reset to bottom checkpoint 436 may train over at least some of the same events as top model layer 422. Accordingly, training data 404 is processed only by model layer 422, 424, and 426 with an appropriate corresponding training window.

Segmented training data 406 is used to train each model layer 422, 424, and 426. Training represents applying at least one machine-learning algorithm to the processing of segmented training data 406. In the example embodiment, segmented training data 406 is trained using a gradient-descent machine learning algorithm. In other embodiments, any suitable machine-learning algorithm may be used.

After each model layer 422, 424, and 426 has trained for a training duration, each model layer 422, 424, and 426 writes a corresponding checkpoint or snapshot 432, 434, and 436. Training duration is identified in training model configuration 428 file. Accordingly, training computing device 116 determines training duration based upon training model configuration 428, ceases training each model layer 422, 424, and 426 when training duration is completed, and writes checkpoints 432, 434, and 436 respectively. Checkpoints 432, 434, and 436 represent the state of each model layer 422, 424, and 426 which may be used to seed other layers and to make operational decisions. After each checkpoint 432, 434, and 436 is written, the associated model layer 422, 424, and 426 restarts training. In at least some examples, training computing device 116 may purge a previously written checkpoint upon writing a new checkpoint.

Non-bottom model layers 422 and 424 (i.e., model layers which are not bottom model layer 426) additionally train by retrieving a checkpoint generated by a parent layer. In other words, non-bottom model layers 422 and 424 retrieve checkpoints 434 and 436 respectively and train on segmented training data 406. Accordingly, non-bottom model layers 422 and 424 train based upon machine-learning of lower layers 424 and 426. As discussed below, the approach of relying on checkpoints from lower layers facilitates improved handling of late-arriving data such as late data 312 (shown in FIG. 3).

Checkpoints 432, 434, and 436 may additionally be checked for validity by training computing device 116. More specifically, training computing device 116 ensures that checkpoints 432, 434, and 436 satisfy prediction requirements for checkpoints before writing each checkpoint 432, 434, and 436 to memory 206 (shown in FIG. 2).

Top checkpoint 432 may be used to synch 440 with AMS server 116 used by ad serving system 120 (shown in FIG. 1). Alternately, any checkpoint 432, 434, and 436 may be used to synch 440 with AMS server 116. As discussed below, unlike training system 300, training system 400 is not exposed to the same problems with late-arriving data such as late data 312.

Figure 5:
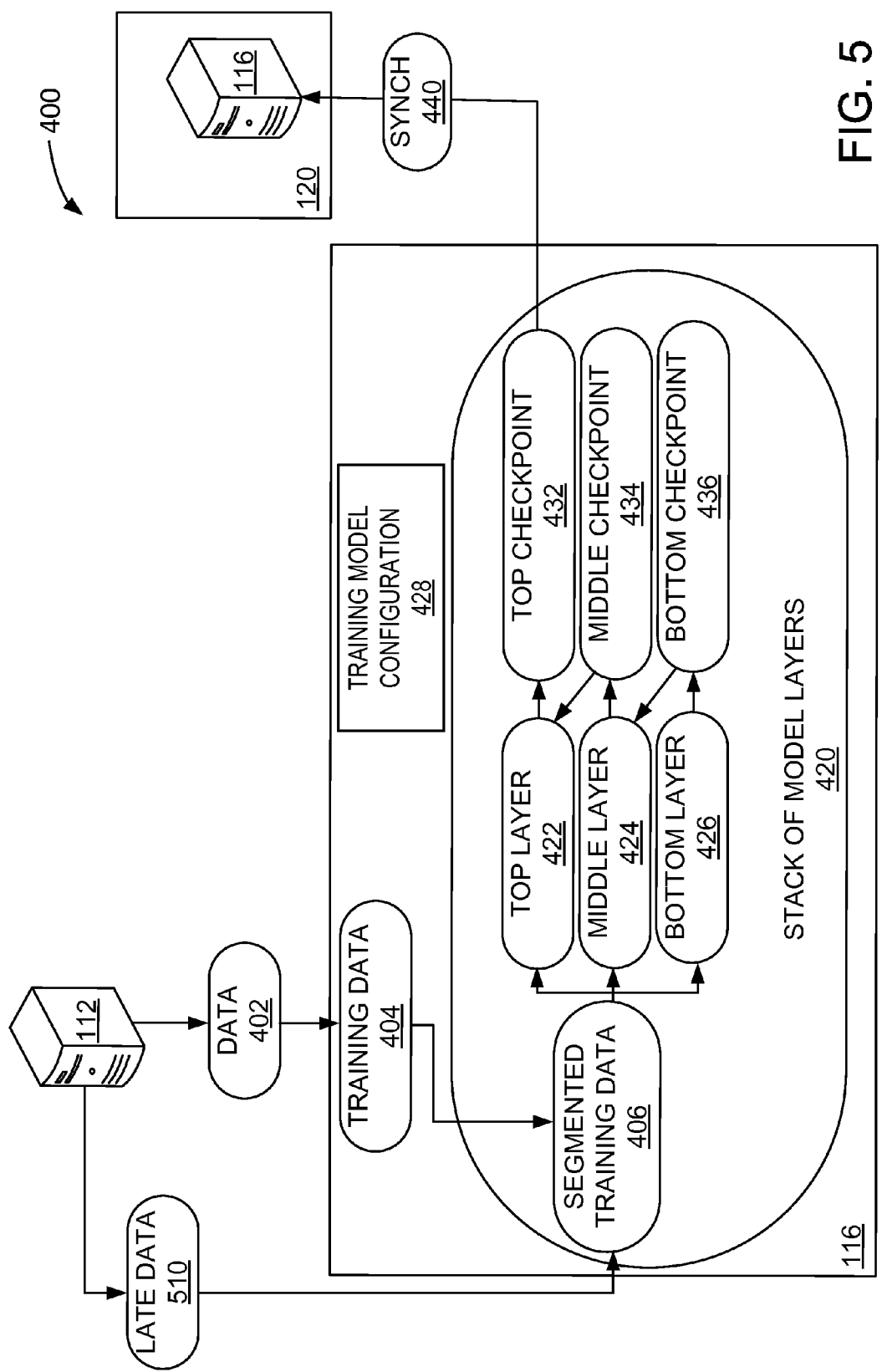
FIG. 5 is an example data flowchart of the training system of FIG. 4 including the processing of late-arriving data.

FIG. 5 is an example data flowchart of training system 400 including the processing of late-arriving data 510. Unlike training system 300, late data 510 is picked up by model layer 422, 424, and 426 depending on the respective training windows of each model layer. As time progresses, late-arriving data 510 is subsequently incorporated into each checkpoint and each model layer. Accordingly, with each checkpoint written by each layer, late-arriving data 510 is incorporated in the training of a child layer.

In the example embodiment, late data 510 includes large data sets associated with reference events that are between thirty and seventy days old. Because late data 510 has a high volume, it is likely that it may disrupt the stability of a model training on it. Additionally, late data 510 is not recent data. Accordingly, processing late data 510 with top model layer 422 will not provide current data and may destabilize the model of top model layer 422. Accordingly, stack of model layers 420 achieves the benefit of incorporating late data 510 without causing instability or bias against current data.

Figure 6:
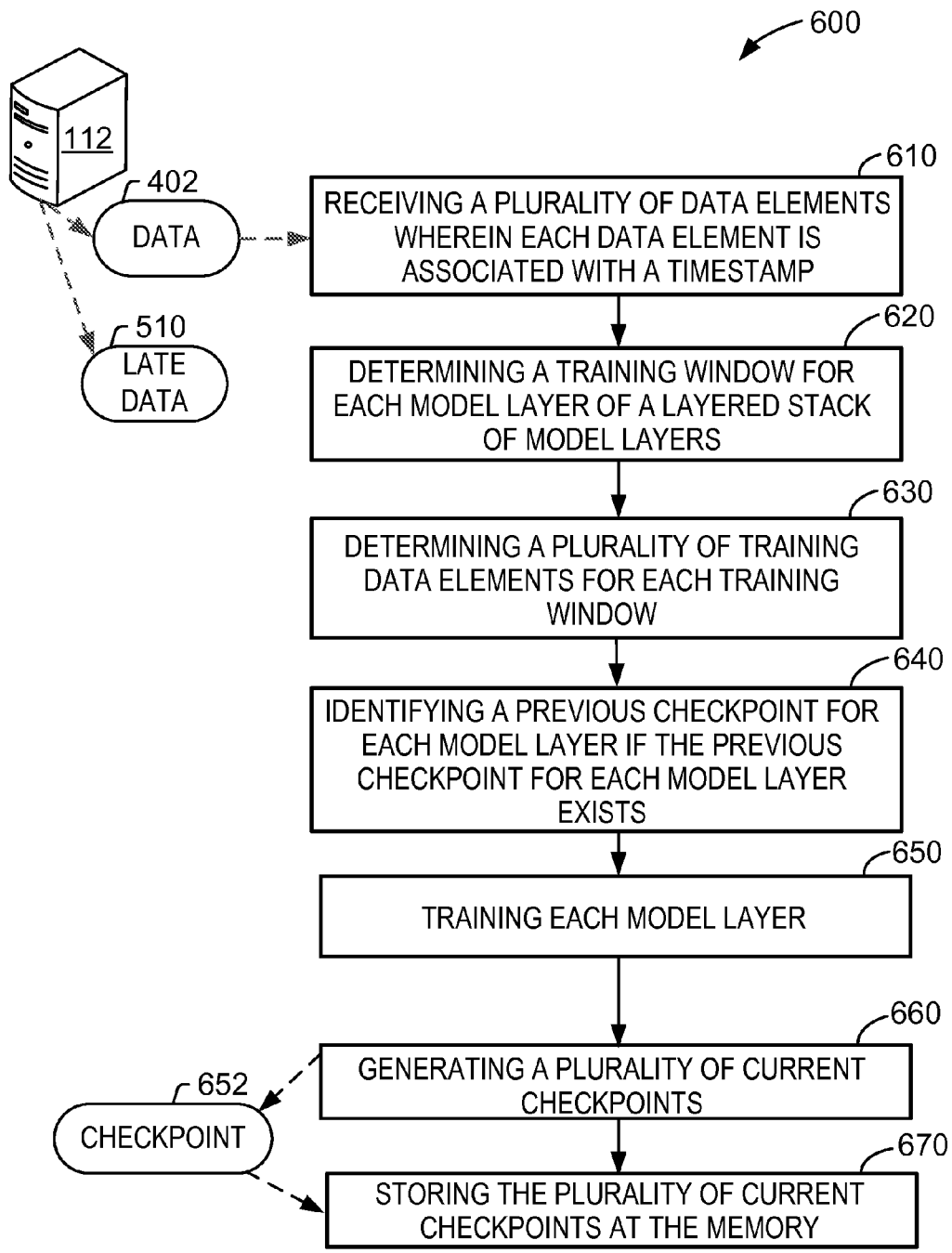
FIG. 6 is an example method for layered training of machine-learning architectures using the advertising environment of FIG. 1.

FIG. 6 is an example method 600 for layered training of machine-learning architectures using advertising environment 100 (shown in FIG. 1). Method 600 is implemented by training computing device 116. Training computing device 116 receives 620 a plurality of data elements wherein each data element is associated with a timestamp. Receiving 620 represents receiving data such as data 402 and late data 510 wherein such data 402 and 510 is associated with a timestamp. The timestamp may be, for example, an event time. In the example of conversion data, the timestamp may be the time of the conversion of an advertisement served to a user. Alternately, the reference event may be any other timestamp relevant to the processing of data 402 and 510.

Training computing device 116 determines 620 a training window for each model layer of a layered stack of model layers. Determining 620 represents identifying a training window for each model layer 422, 424, and 426 (shown in FIG. 4) of a stack of model layers 420 (shown in FIG. 4). Each training window is determined by determining a layer depth of each model layer 422, 424, and 426, retrieving a training model configuration 428 (shown in FIG. 4) wherein training model configuration 428 designates a training delay record associated with each layer depth. Training computing device 116 further identifies a training delay associated with the layer depth of each model layer 422, 424, and 426 based upon training model configuration 428 and calculates a training window based upon the training delay for each model layer 422, 424, and 426.

Training computing device 116 determines 630 a plurality of training data elements for each training window by identifying data elements with timestamps corresponding to each of the training windows. Accordingly, determining 630 represents identifying subsets of data 402 and 510 which have timestamps corresponding to the training window of each of model layers 422, 424, and 426.

Training computing device 116 further identifies 640 a previous checkpoint for each model layer if the previous checkpoint for each model layer exists, wherein the previous checkpoint for each model layer is generated by a parent model layer. Identifying 640 represents training computing device 116 identifying checkpoint 432, 434, and 436 for each model layer 422, 424, and 426. More specifically, identifying 640 represents training computing device identifying checkpoint 432, 434, and 436 generated by a parent model layer of each model layer 422, 424, and 426. In at least some examples, as described herein, bottom model layer 426 may not have a checkpoint generated by a parent model layer. Accordingly, in such examples, no checkpoint is identified because no checkpoint exists.

Training computing device 116 additionally trains 650 each model layer with the determined training data elements for each model layer and the identified previous checkpoint, if any, for each model layer. Training 650 represents applying at least one machine-learning algorithm to the processing of each checkpoint identified 640 for each model layer 422, 424, and 426 and segmented training data 406. As described above, in at least some examples, a checkpoint generated by a parent model layer of the bottom model layer may not exist. Accordingly, in such examples, the previous checkpoint may not be used by training computing device 116 to train 650. In such examples, training computing device 116 trains 650 on training data elements without starting training from a checkpoint.

Training computing device 116 also generates 660 a plurality of current checkpoints wherein each current checkpoint of the plurality of current checkpoints is associated with a model layer. Generating 660 represents creating a state of each model layer 422, 424, and 426 such that the state may be received as a checkpoint 432, 434, and 436 and used to train at least one model layer 422, 424, and 426.

Training computing device 116 additionally stores 670 the plurality of checkpoints at the memory. Storing 670 represents storing at least one checkpoint 432, 434, and 436 at memory 206 (shown in FIG. 2).

Figure 7:
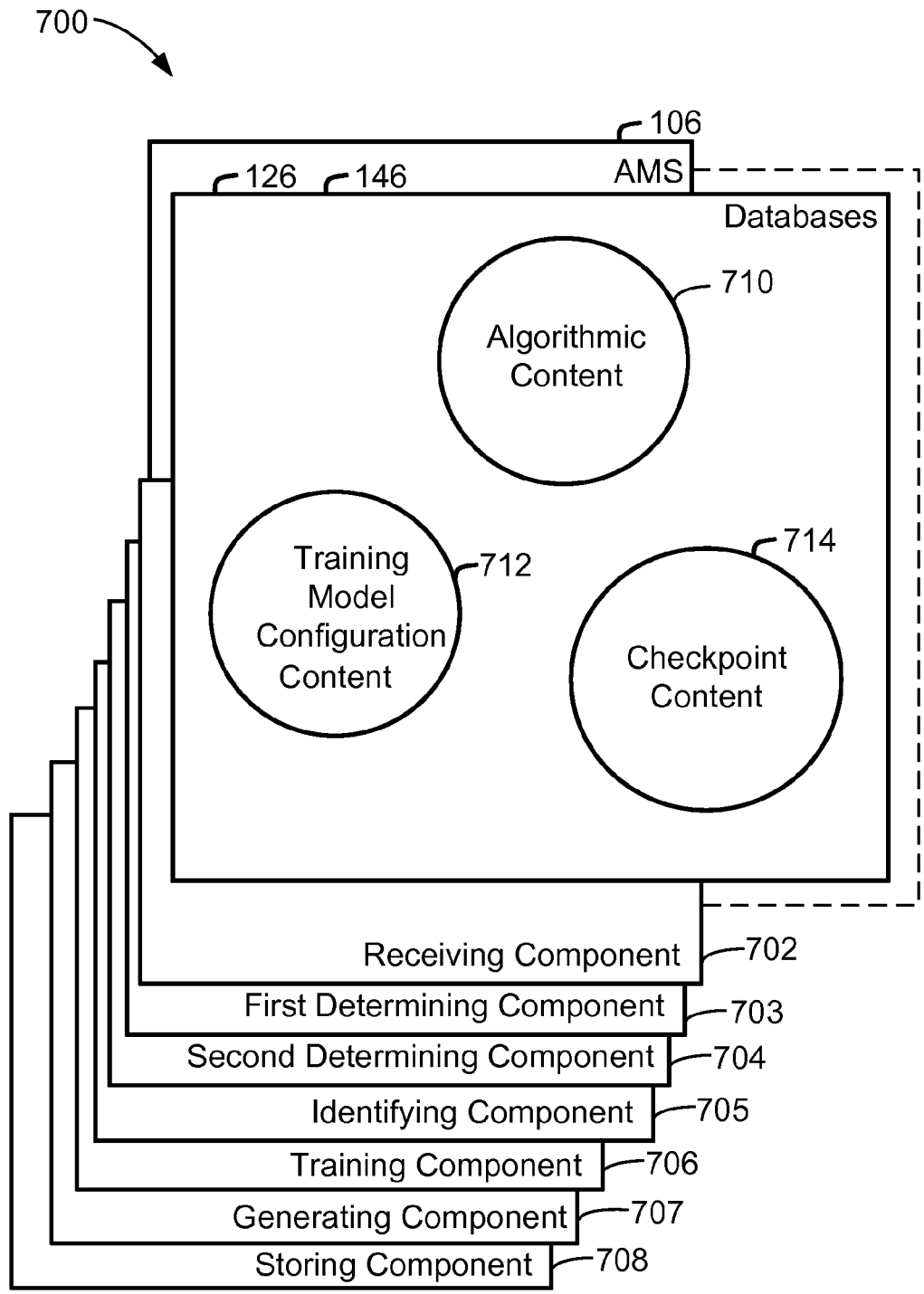
FIG. 7 is a diagram of components of one or more example computing devices that may be used in the environment shown in FIG. 1.

FIG. 7 is a diagram 700 of components of one or more example computing devices, for training computing device 116 (shown in FIG. 4), that may be used in environment 100 (shown in FIG. 1).

For example, one or more of computing devices 200 may form advertising management system (AMS) 106, customer computing device 108 (both shown in FIG. 1), and training computing device 116. FIG. 7 further shows a configuration of databases 126 and 146 (shown in FIG. 1). Databases 126 and 146 are coupled to several separate components within AMS 106, content provider data processing system 112, and customer computing device 108, which perform specific tasks.

AMS 106 includes a receiving component 702 for receiving a plurality of data elements such as data 402 (shown in FIG. 4) and late data 510 (shown in FIG. 5) wherein each data element is associated with a timestamp. AMS 106 additionally includes a first determining component 703 for determining a training window for each model layer of a layered stack of model layers. AMS 106 further includes a second determining component 704 for determining a plurality of training data elements for each training window by identifying the data elements with timestamps corresponding to each of the training windows. AMS 106 also includes an identifying component 705 for identifying a previous checkpoint for each model layer, wherein the previous checkpoint for each model layer is generated by a parent model layer. AMS 106 additionally includes a training component 706 for training each model layer with the determined training data elements for each model layer and the identified previous checkpoint for each model layer. AMS 106 further includes a generating component 707 for generating a plurality of current checkpoints, wherein each current checkpoint of the plurality of current checkpoints is associated with a model layer. AMS 106 also includes a storing component 708 for storing the plurality of current checkpoints at the memory.

In an exemplary embodiment, databases 126 and 146 are divided into a plurality of sections, including but not limited to, an algorithmic content section 710, a training model configuration content section 712, and a checkpoint section 714. These sections within database 126 and 146 are interconnected to update and retrieve the information as required.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the subject matter described herein or its features may have different names, formats, or protocols. Further, the system may be implemented via a combination of hardware and software, as described, or entirely in hardware elements. Also, the particular division of functionality between the various system components described herein is merely for the purposes of example only, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

While the disclosure has been described in terms of various specific embodiments, it will be recognized that the disclosure can be practiced with modification within the spirit and scope of the claims.

What is claimed is:

1. A computer-implemented method for layered training of machine-learning architectures, the method implemented by a training computing device including a processor coupled to a memory, the method comprising:
   receiving a plurality of data elements wherein each data element is associated with a timestamp;
   determining a training window for each model layer of a layered stack of model layers;
   determining a plurality of training data elements for each training window by identifying the data elements with timestamps corresponding to each of the training windows;
   identifying a previous checkpoint for each model layer, wherein the previous checkpoint for each model layer is generated by a parent model layer;
   training each model layer with the determined training data elements for each model layer and the identified previous checkpoint for each model layer;
   generating a plurality of current checkpoints, wherein each current checkpoint of the plurality of current checkpoints is associated with a model layer;
   storing the plurality of current checkpoints at the memory; and
   synchronizing an external server with at least one current checkpoint associated with at least one model layer, wherein the external server serves based at least partially on the synchronized current checkpoint.

2. The method of claim 1, wherein training each model layer further comprises:
   adapting each model layer to the determined training data elements for each model layer by applying at least one machine-learning algorithm.

3. The method of claim 1, wherein determining a training window for each model layer further comprises:
    determining a layer depth of each model layer;
    retrieving a training model configuration wherein the training model configuration designates a training delay record associated with each layer depth;
    identifying a training delay associated with the layer depth of each model layer based upon the training model configuration; and
    calculating a training window based upon the training delay for each model layer.

4. The method of claim 1, wherein generating a plurality of current checkpoints further comprises:
    determining a layer depth for each model layer;
    retrieving a training model configuration wherein the training model configuration designates a training duration associated with each layer depth;
    identifying a training duration associated with the layer depth of each model layer based upon the training model configuration;
    training the model layer for the identified training duration; and
    processing each model layer into the current checkpoint.

5. The method of claim 1, wherein generating a plurality of current checkpoints further comprises:
    purging the previous checkpoint for each model layer; and
    retraining each model layer.

6. The method of claim 1, wherein receiving a plurality of data elements further comprises:
    receiving a plurality of conversion data, wherein the conversion data represents conversion activity associated with serving online advertisements.

7. A computer-implemented method for layered training of machine-learning architectures, the method implemented by a training computing device including a processor coupled to a memory, the method comprising:
    receiving a plurality of data elements wherein each data element is associated with a timestamp;
    determining a training window for each model layer of a layered stack of model layers;
    determining a plurality of training data elements for each training window by identifying the data elements with timestamps corresponding to each of the training windows;
    identifying a previous checkpoint for each model layer wherein the previous checkpoint for each model layer is generated by a parent model layer;
    training each model layer with the determined training data elements for each model layer and the identified previous checkpoint for each model layer;
    generating a plurality of current checkpoints, wherein each current checkpoint of the plurality of current checkpoints is associated with a model layer; and
    storing the plurality of current checkpoints at the memory, wherein storing the plurality of current checkpoints further comprises:
        validating each checkpoint of the plurality of current checkpoints against the plurality of data elements; and
        storing validated checkpoints of the plurality of current checkpoints at the memory.

8. A training computing device for layered training of machine-learning architectures, the training computing device comprising a memory for storing data, and a processor in communication with the memory, said processor programmed to:
    receive a plurality of data elements wherein each data element is associated with a timestamp;
    determine a training window for each model layer of a layered stack of model layers;
    determine a plurality of training data elements for each training window by identifying the data elements with timestamps corresponding to each of the training windows;
    identify a previous checkpoint for each model layer wherein the previous checkpoint for each model layer is generated by a parent model layer;
    train each model layer with the determined training data elements for each model layer and the identified previous checkpoint for each model layer;
    generate a plurality of current checkpoints, wherein each current checkpoint of the plurality of current checkpoints is associated with a model layer;
    store the plurality of current checkpoints at the memory;
    purge the previous checkpoint for each model layer; and
    retrain each model layer.

9. The training computing device of claim 8, wherein the processor is further programmed to:
    adapt each model layer to the determined training data elements for each model layer by applying at least one machine-learning algorithm.

10. The training computing device of claim 8, wherein the processor is further programmed to:
    determine a layer depth of each model layer;
    retrieve a training model configuration wherein the training model configuration designates a training delay record associated with each layer depth;
    identify a training delay associated with the layer depth of each model layer based upon the training model configuration; and
    calculate a training window based upon the training delay for each model layer.

11. The training computing device of claim 8, wherein the processor is further programmed to:
    synchronize an external server with at least one current checkpoint associated with at least one model layer, wherein the external server serves based at least partially on the synchronized current checkpoint.

12. The training computing device of claim 8, wherein the processor is further programmed to:
    determine a layer depth for each model layer;
    retrieve a training model configuration wherein the training model configuration designates a training duration associated with each layer depth;
    identify a training duration associated with the layer depth of each model layer based upon the training model configuration;
    train the model layer for the identified training duration; and
    process each model layer into the current checkpoint.

13. The training computing device of claim 8, wherein the processor is further programmed to:
    validate each checkpoint of the plurality of current checkpoints against the plurality of data elements; and
    store validated checkpoints of the plurality of current checkpoints at the memory.

14. The training computing device of claim 8, wherein the processor is further programmed to:
    receive a plurality of conversion data, wherein the conversion data represents conversion activity associated with serving online advertisements.

15. A non-transitory computer-readable storage device, having processor-executable instructions embodied thereon, for layered training of machine-learning architectures, wherein the computer includes at least one processor and a memory coupled to the processor, wherein, when executed by the computer, the processor-executable instructions cause the computer to:

receive a plurality of data elements wherein each data element is associated with a timestamp;

determine a training window for each model layer of a layered stack of model layers;

determine a plurality of training data elements for each training window by identifying the data elements with timestamps corresponding to each of the training windows;

identify a previous checkpoint for each model layer wherein the previous checkpoint for each model layer is generated by a parent model layer;

train each model layer with the determined training data elements for each model layer and the identified previous checkpoint for each model layer;

generate a plurality of current checkpoints, wherein each current checkpoint of the plurality of current checkpoints is associated with a model layer;

store the plurality of current checkpoints at the memory; and synchronize an external server with at least one current checkpoint associated with at least one model layer, wherein the external server serves based at least partially on the synchronized current checkpoint.

16. The computer-readable storage device of claim 15, wherein the processor-executable instructions cause the computing device to:

adapt each model layer to the determined training data elements for each model layer by applying at least one machine-learning algorithm.

17. The computer-readable storage device of claim 15, wherein the processor-executable instructions cause the computing device to:

determine a layer depth of each model layer;

retrieve a training model configuration wherein the training model configuration designates a training delay record associated with each layer depth;

identify a training delay associated with the layer depth of each model layer based upon the training model configuration; and calculate a training window based upon the training delay for each model layer.

* * * * *